Sept. 26, 1967      S. SCHUILWERVE      3,343,802
PRESSURE SEALED ROTARY CYLINDRICAL SHUT-OFF VALVE
Filed Jan. 21, 1965      3 Sheets-Sheet 1
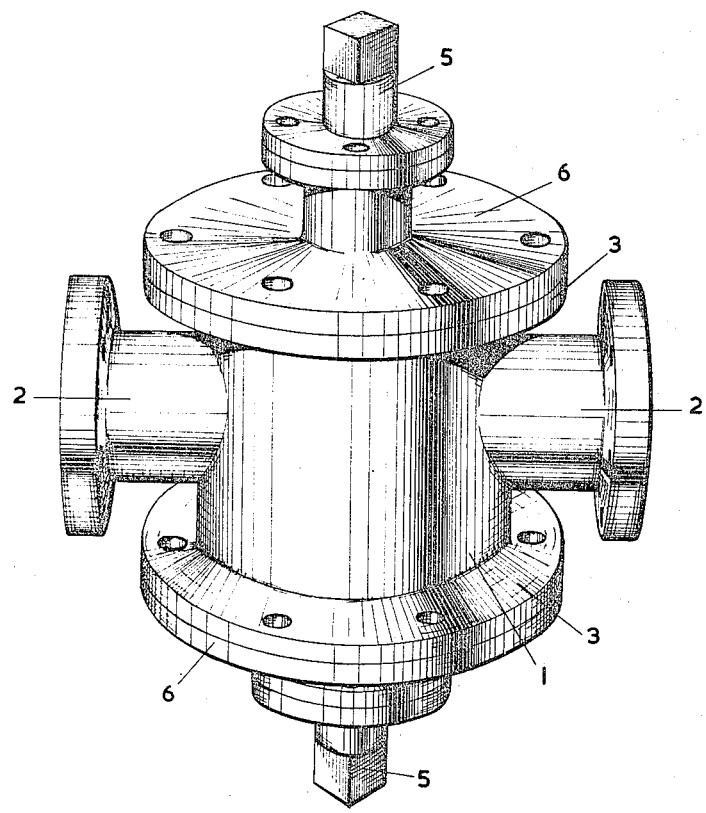
INVENTOR
STEVEN SCHUILWERVE
BY
ATTORNEY

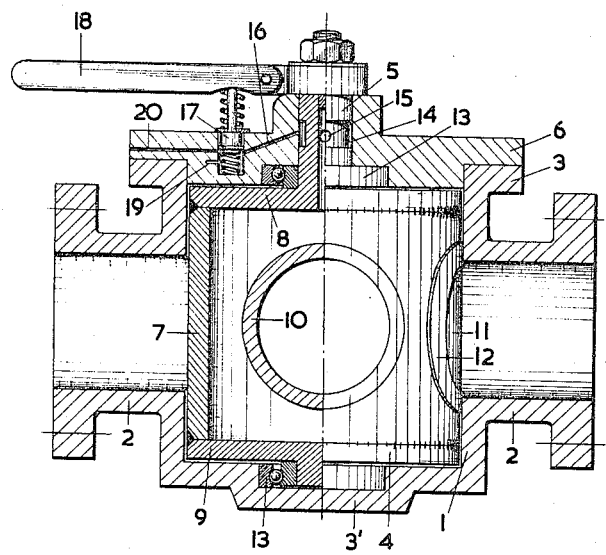
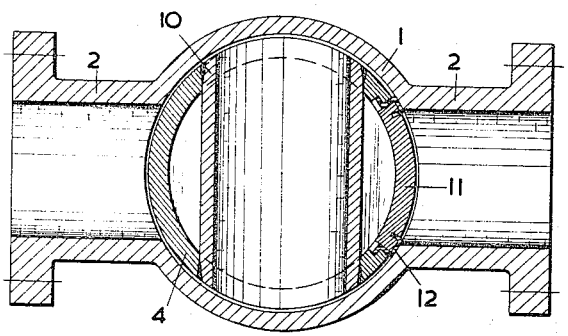

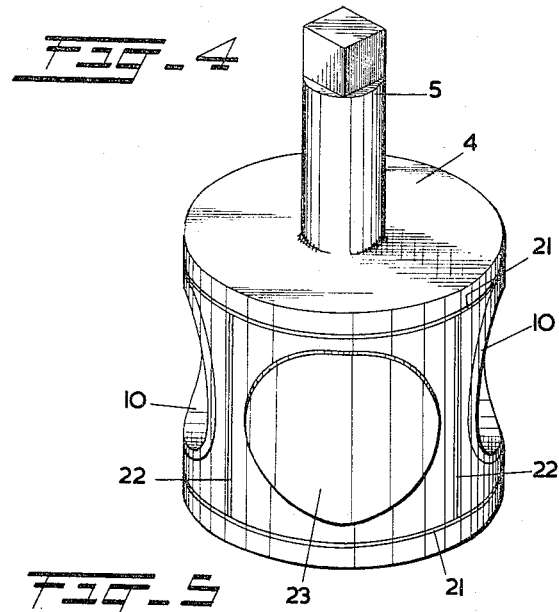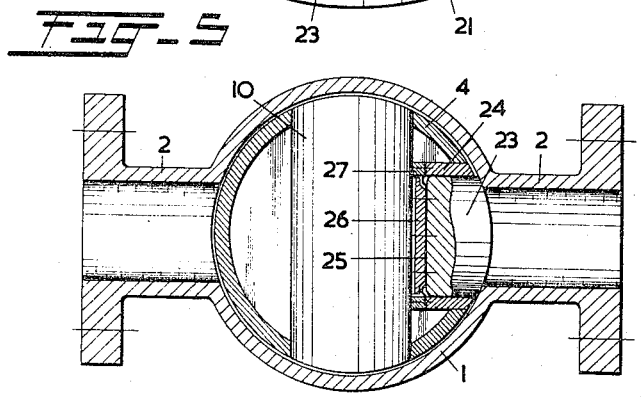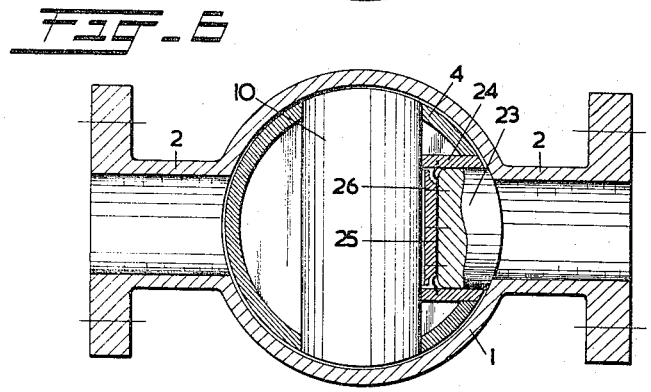

United States Patent Office 3,343,802
Patented Sept. 26, 1967

3,343,802
PRESSURE SEALED ROTARY CYLINDRICAL SHUT-OFF VALVE
Steven Schuilwerve, 7 Albert Verweystraat, Breda, Netherlands
Filed Jan. 21, 1965, Ser. No. 426,773
Claims priority, application Belgium, Jan. 27, 1964, 43,336
4 Claims. (Cl. 251—175)

ABSTRACT OF THE DISCLOSURE

This invention relates to a novel valve adapted to be used in connection with fluid conduits which valve has an open position allowing unobstructed free flow of fluid and a closed position effectively sealing the flow of fluid. The valve comprises a housing having an inlet and an outlet and a movable cylindrical element inserted at right angles to the conduit. This cylindrical movable element encloses a second cylindrical element aligned at right angle to the movable cylindrical element. A portion of the peripheral wall of the movable cylindrical element is adapted to be forced radially outwardly upon the admission of a pressuring medium into the movable cylindrical element. Specifically, the means adapted to move radially outwardly may comprise a portion of the peripheral wall of the cylindrical movable element which has been cut out and reinserted with the interposition of a rubber or resilient sealing ring. Another embodiment comprises a movable member and a diaphragm abutting the movable member. A third embodiment comprises axial and radial grooves in the peripheral wall which contain sealing springs. A fourth embodiment comprises a portion of the peripheral wall which has been cut out and which rests against a lining of rubber, or similar material, which lining surrounds the entire plug.

---

The invention relates to a cock with a housing which is provided with supply and discharge connections for the medium to be shut off by the cock and which has a cylindrical space in which is contained a likewise cylindrical plug which is fitted with a cylindrical passage, the centre line of which intersects the centre line of the plug itself at right angles and the internal diameter of which is approximately equal to the diameter of the supply and discharge connections, the plug being adapted to rotate between a position in which the cylindrical passage forms a connection between the supply and discharge connections and a position in which the cylindrical passage is at right angles thereto, while the plug is further equipped with a member for shutting off at least one of the connections in the latter position in a sealing way.

In a cock of this type known from the Dutch patent specification 47,803 the closing mmeber is formed by an elastic tube fitted round the plug, and in this case effective sealing is dependent upon the pressure directed radially outwards, which pressure is produced by the elasticity of the tube. In many cases this is not suffiicent to ensure effective sealing, and it is the object of the invention to furnish a cock of the type mentioned in the preamble, in which effective sealing is invariably ensured under many widely varying circumstances.

This object is achieved according to the invention by the feature that the hollow plug is provided with a connection via which a source of pressure medium can be connected with the space inside the plug, between its peripheral wall and the wall of its cylindrical passage, while in the peripheral wall of the plug at least one member adapted to move radially outwards is fitted so as to seal the plug, in such a way that upon admission of pressure medium into the space inside the plug in the closed position of the cock said member is forced against the parts of the housing surrounding a supply or discharge connection so as to seal said parts.

The pressure medium to be admitted into the hollow space inside the plug may be the medium to be shut off by the cock, which is fed, for instance, via a branch pipe from the upstream or the downstream side of the cock, but it may also be an independent hydraulic or pneumatic pressure medium.

The member fitted in the peripheral wall of the plug may consist of a portion of said wall itself, which has been cut out of it and subsequently reinserted, with interposition of a ring of rubber or similar material, which is connected with the peripheral wall as well as with its cut out portion and which at the same time seals against the housing of the cock when the cut-out portion is forced outwards. The portion cut out of the peripheral wall may also rest against a lining of rubber or similar material surrounding the whole plug and continued over the cut-out portion.

The member fitted in the peripheral wall of the plug may also consist of a sliding member which is connected via a diaphragm with the plug and is provided at the back with a saddle which in the unloaded position of the sliding member may rest as a stop against the wall of the cylindrical passage in the plug.

In the cylindrical wall of the plug circular as well as axial grooves may have been provided, in which are located circular or axial sealing springs respectively.

The invention will now be explained more fully by reference to the drawing.

FIG. 1 shows a perspective view of a cock according to the invention, with a relieved plug.

FIG. 2 shows a vertical section of a cock according to the invention, with a plug not fully relieved.

FIG. 3 shows a horizontal section of the cock according to FIG. 2.

FIG. 4 shows a perspective view of a plug which is provided with sealing springs.

FIG. 5 shows a partial section of a cock with a sliding member in the plug.

FIG. 6 shows a section according to FIG. 5, of another embodiment of the fastening of the sliding member.

The housing of the cock mainly consists of a cylindrical part 1, on which two connecting studs 2 are mounted according to a centre line intersecting the centre line of the cylindrical part 1 at right angles, while at the radial end faces of the cylindrical part 1 flanges 3 and 3' respectively are fitted.

In the embodiment according to FIG. 1 a flange 3 provided with bolt holes has been welded to the two axial ends of the cylindrical part 1, whilst in the embodiment according to FIG. 2 a flange 3 provided with bolt holes has been welded to one end only, the other end of the cylindrical part 1 being closed by a blind flange 3'. Accommodated in the cylindrical part 1 of the housing is a cylindrical plug 4, which in the embodiment according to FIG. 1 is provided at both axial ends with a handle 5, while in the embodiment according to FIGS. 2 and 3 it is provided with a handle 5 only at the upper end. The embodiment according to FIG. 1 not only has the advantage that it can be operated from either end, but moreover the pressure of the medium is the same at either end of the plug, so that the plug is completely relieved. In the embodiment according to FIG. 2 a partial relieving can be obtained by admitting the medium at both end faces of the plug, but the handle 5 present at only one end prevents complete relieving. In the embodiment according to FIG. 1 as well as in that according to FIG. 2 the handle 5, while sealed, is adapted to rotate in a lid 6 which has been fastened on the flange 3.

The body of the plug 4 preferably consists of a tube 7 on which end plates 8 and 9 have been welded. At right angles to the centre line of the tube 7 a cylindrical bore has been provided, the centre line of which intersects the centre line of the tube 7 at right angles, and into this bore a second, smaller cylindrical tube 10 has been welded. The tube 10 thus forms a passage through the body of the plug, and when the tube 10 is in line with the connecting studs 2, the cock is opened, whilst when the plug 4 is rotated in such a way that the tube 10 is at right angles to the connecting studs 2, the cock is closed.

In the embodiment according to FIGS. 2 and 3 in the cylindrical wall of the plug 4, at right angles to the centre line of the plug itself and at the same time at right angles to the centre line of the tube 10, at least on one side a round cutting out has been made, which therefore in the closed position of the cock faces one of the connecting studs 2. Into this round cutting out the cut-out portion 11 has been reinserted, with interposition of a rubber ring 12, which has been let into a round groove on the outside of the cut-out portion 11 and at the same time into a round groove in the inner wall of the cutting out in the plug 4. The cross-section of the rubber ring 12 is substantially hook-shaped, so that between its two ends let into the portion 11 and the plug 4 respectively the ring 12 has an outwardly directed surface, which rests against the part of the housing which surrounds the passage in the connecting stud 2. Pressure medium can be admitted into the hollow space inside the plug 4, between the tube 7 and the tube 10, and when pressure medium is admitted in the closed position of the cock, this pressure medium will force the position 11 outwards, the rubber ring 12 thus sealing against the housing.

The plug 4 therefore need not itself be ground in the cylindrical part 1 of the housing, because the sealing in the closed position is effected by the pressure member 11. The plug may therefore be readily movable. The ready movability of the plug 4 can be promoted even further by supporting it in the housing 1 on ball bearings 13. The relieving of the plug (FIG. 1) also contributes to its ready movability.

With a view to the feeding of the pressure medium into the hollow space inside the plug 4 the handle 5 of the plug is provided with a circular groove 14, with which is connected a bore 15 made in the handle 5, which bore ends in the hollow space inside the plug 4. In the lid 6 of the housing of the cock a channel 16 is provided, which ends in the circular groove 14. Furthermore in the lid 6 of the cock a control valve 17 has been fitted, which can be moved by hand via a lever 18 with a view to connecting the pipe 16, as desired, with a supply pipe 19 or a discharge pipe 20 for pressure medium. The lever 18 can also be operated in a different way, e.g., mechanically. The supply pipe 19 may be connected with the upstream or downstream medium in one of the connecting studs 2, but it may also be connected with a source of an independent hydraulic or pneumatic pressure medium. The discharge pipe 20 may be connected with a return pipe or may end in the atmosphere, when the pressure medium is allowed to escape into the atmosphere.

When the cock is in the closed position according to FIGS. 2 and 3, the pressure medium can flow via the pipe 19, the pipe 16, the groove 14, and the channel 15 to the space inside the plug 4, between the tube 7 and the tube 10, so that the portion 11 inserted into the wall of the plug 4 is subjected to pressure and is forced against the housing 1. The rubber ring 12 thus provides for a sealing of the plug 4 in relation to the connecting stud 2, see the right side in FIGS. 2 and 3.

If it is desired to place the cock in the opened position, first the lever 18 is depressed, in consequence of which the pressure medium can escape from the plug 4 to the discharge pipe 20. The pressure on the portion 11 is thus removed, and the plug can be rotated through 90° until the tube 10 is in line with the two connecting studs 2. When the cock is closed, first the tube 10 is returned to the position of FIG. 3, and then the pressure medium is admitted again via the channel 19 and the valve 17 to the interior of the plug 4.

Instead of inserting the portion 11 cut out of the cylindrical wall of the plug 4 with the aid of a rubber ring 12, one may also simply reinsert it and line the cylindrical wall of the plug 4 with a rubber layer continued over the portion 11, which layer forms the seal between the portion 11 and the cylindrical wall of the plug 4 as well as the seal against the wall of the housing 1.

In the embodiment according to FIG. 4 the plug is provided with circular grooves above and below the openings made in the cylindrical surface and with axial grooves extending between said openings. In the circular grooves are placed sealing springs 21 and in the axial grooves, sealing springs 22. The sealing springs 21 and 22 prevent pressure medium leaking away along the plug.

In the embodiment according to FIGS. 5 and 6 instead of the cut out portion 11 a sliding member 23 has been fitted in an opening of the cylindrical wall of the plug 4, which sliding member, viewed from the centre line of the plug 4, is adapted to move radially in a short tube 24, which has been welded in the opening of the cylindrical wall of the plug 4. The sliding member 23 is forced by the pressure medium against the parts of the housing which surround the opening of the connecting tube 2, and the sliding member 23 thus provides for the sealing against the connecting stud 2. The sealing between the sliding member 23 and the tube 24 is provided for by a diaphragm 25, which consists of stainless steel, for instance. Near the circumference the diaphragm 25 has been depressed so as to ensure good flexibility. At the back of the diaphragm 25 a saddle 26 is fitted, which rests on the outer wall of the tube 10. The saddle 26, the diaphragm 25, and the sliding member 23 are connected, for instance, by bolts. In the position of rest the saddle 26 rests against the tube 10, and when pressure medium is admitted, the sliding member 23 is forced away and the saddle 26 is disengaged from the tube 10.

According to FIG. 5 the diaphragm 25 is fixed on the tube 24 with the aid of a locking ring 27 and a set of small bolts, and according to FIG. 6 the diaphragm 25 is fixed in the tube 24 by rolling the circumferential edge of the diaphragm into a circular groove of the tube 24.

Since both the housing and the plug of the cock may have a welded construction, the cock can be produced in an inexpensive way. Furthermore it furnishes excellent sealing, which is determined by the pressure of the medium. The admission of the medium into the hollow space inside the plug and the rotation of the plug itself can, if desired, be controlled by regulating members. The cock can also be fixed in partially opened positions by the admission of pressure medium, which then forces the portion 11 or the sliding member 23 against the cylindrical wall of the housing 1 and thus holds the plug.

It is observed that it is known per se to press a closing member in a cock with the aid of pressure medium. In that case, however, no unobstructed passage is obtained in the opened position of the cock.

It is self-evident that within the scope of the invention variants and other embodiments are also possible. Thus, the relieving of the plug, for instance, can also be obtained, instead of by a second handle, by a provision at the lower end of the plug, by means of which a part of this lower end, corresponding in area to the cross-section of the handle, remains unloaded.

Furthermore it is possible, for instance, to fit on the housing a third connecting stud at right angles to the two connecting studs 2, e.g., to the front in FIG. 1. Such a construction is useful, for instance, as a three-way cock, but it also has a special advantage when it is normally incorporated in a straight pipe and the third connecting stud is closed by a blind flange. In fact, in this case in the closed position of the cock, after removal of the blind flange, it is possible to insert a steel ball into the hollow space inside the plug, and by a rotation of the plug through 90° the ball is introduced into the pipe for cleaning it. Cleaning a pipe with the aid of a steel ball is known per se, but in the embodiment here described the introduction of one or more steel balls is very easy.

What I claim is:

1. A valve comprising a housing having an inlet and an outlet arranged along a common longitudinal axis, a movable cylindrical element, said movable cylindrical element arranged at right angles to the axis through the inlet and outlet and adapted to be rotated about an axis perpendicular to the axis through the inlet and outlet, said movable cylindrical element enclosing a second cylindrical element of approximately the same cross section as the inlet and outlet and being arranged at right angles to the axis of rotation of the movable cylindrical element whereby in the open valve position flow occurs through the inlet and outlet and housing via said second cylindrical element, means to rotate said movable cylindrical element, means adapted to admit a pressure medium into the movable cylindrical element, and means in the peripheral wall of the movable cylindrical element adapted to be forced radially outwardly by the pressure medium to stop flow through the housing when the movable cylindrical element is rotated to a position where the enclosed second cylindrical element is out of communication with the inlet and outlet and said sealing means is in communication with the inlet and outlet, characterized in that the means fitted in the peripheral wall of the movable cylindrical element consists of a part of said wall which has been cut out and subsequently re-inserted with the interposition of a ring of resilient material which is connected with the peripheral wall as well as its cut out portion.

2. A valve comprising a housing having an inlet and an outlet arranged along a common longitudinal axis, a movable cylindrical element, said movable cylindrical element arranged at right angles to the axis through the inlet and outlet and adapted to be rotated about an axis perpendicular to the axis through the inlet and outlet, said movable cylindrical element enclosing a second cylindrical element of approximately the same cross section as the inlet and outlet and being arranged at right angles to the axis of rotation of the movable cylindrical element whereby in the open valve position flow occurs through the inlet and outlet and housing via said second cylindrical element, means to rotate said movable cylindrical element, means adapted to admit a pressure medium into the movable cylindrical element, and means in the peripheral wall of the movable cylindrical element adapted to be forced radially outwardly by the pressure medium to stop flow through the housing when the movable cylindrical element is rotated to a position where the enclosed second cylindrical element is out of communication with the inlet and outlet and said sealing means is in communication with the inlet and outlet, characterized in that the portion cut out of the peripheral wall of the movable cylindrical element rests against a lining of resilient material surrounding the whole movable cylindrical element and continuing over the cut out portion.

3. A valve comprising a housing having an inlet and an outlet arranged along a common longitudinal axis, a movable cylindrical element, said movable cylindrical element arranged at right angles to the axis through the inlet and outlet and adapted to be rotated about an axis perpendicular to the axis through the inlet and outlet, said movable cylindrical element enclosing a second cylindrical element of approximately the same cross section as the inlet and outlet and being arranged at right angles to the axis of rotation of the movable cylindrical element whereby in the open valve position flow occurs through the inlet and outlet and housing via said second cylindrical element, means to rotate said movable cylindrical element, means adapted to admit a pressure medium into the movable cylindrical element, and means in the peripheral wall of the movable cylindrical element adapted to be forced radially outwardly by the pressure medium to stop flow through the housing when the movable cylindrical element is rotated to a position where the enclosed second cylindrical element is out of communication with the inlet and outlet and said sealing means is in communication with the inlet and outlet, characterized in that the means fitted in the peripheral wall of the movable cylindrical element consists of a sliding member which is connected via a diaphragm with the movable cylindrical element and is provided at the back with a saddle which in the unloaded position of the sliding member, may rest as a stop against the wall of the cylindrical passage in the movable cylindrical element.

4. A valve comprising a housing having an inlet and an outlet arranged along a common longitudinal axis, a movable cylindrical element, said movable cylindrical element arranged at right angles to the axis through the inlet and outlet and adapted to be rotated about an axis perpendicular to the axis through the inlet and outlet, said movable cylindrical element enclosing a second cylindrical element of approximately the same cross section as the inlet and outlet and being arranged at right angles to the axis of rotation of the movable cylindrical element whereby in the open valve position flow occurs through the inlet and outlet and housing via said second cylindrical element, means to rotate said movable cylindrical element, means adapted to admit a pressure medium into the movable cylindrical element, and means in the peripheral wall of the movable cylindrical element adapted to be forced radially outwardly by the pressure medium to stop flow through the housing when the movable cylindrical element is rotated to a position where the enclosed second cylindrical element is out of communication with the inlet and outlet and said sealing means is in communication with the inlet and outlet, characterized in that the peripheral wall of the movable cylindrical element has circular as well as axial grooves in which are located circular as well as axial sealing springs, respectively.

References Cited

UNITED STATES PATENTS

| 465,670 | 12/1891 | LeMieux | 251—175 |
| 715,745 | 12/1902 | Bickford | 251—175 |
| 1,760,951 | 6/1930 | Manifold | 251—175 |
| 2,998,220 | 8/1961 | Grieselhuber | 251—175 |
| 3,042,360 | 7/1962 | Sneddon | 251—175 |

FOREIGN PATENTS 713,532  10/1931  France.

CLARENCE R. GORDON, *Primary Examiner.*